UNITED STATES PATENT OFFICE.

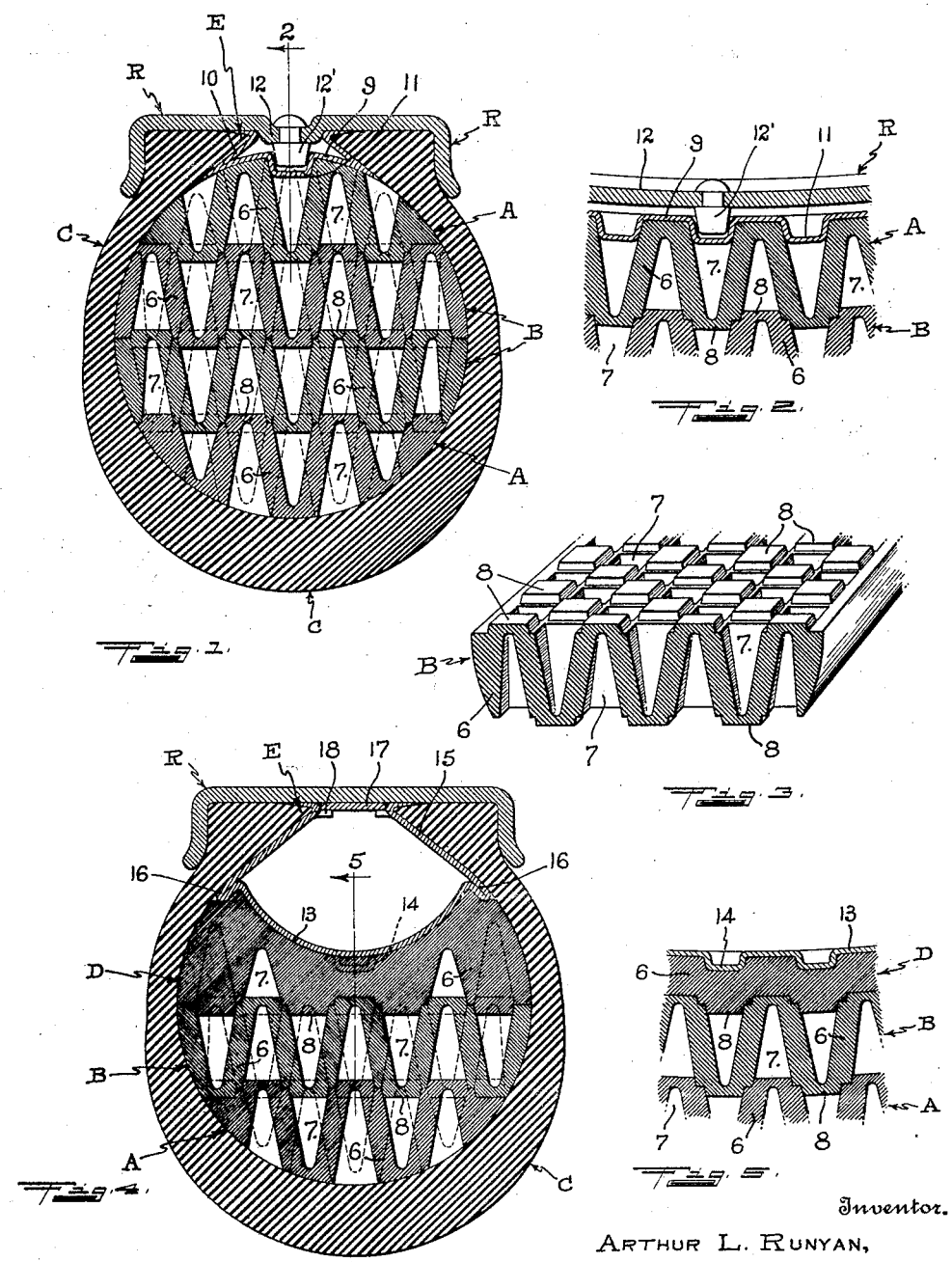

ARTHUR L. RUNYAN, OF OMAHA, NEBRASKA.

RESILIENT TIRE-FILLER.

1,343,685.  Specification of Letters Patent.  Patented June 15, 1920.

Application filed February 1, 1919. Serial No. 274,580.

*To all whom it may concern:*

Be it known that I, ARTHUR L. RUNYAN, a citizen of the United States, and a resident of Omaha, in the county of Douglas and State of Nebraska, have invented certain new and useful Improvements in Resilient Tire-Fllers, of which the following is a specification.

My invention relates to resilient fillers adapted to be disposed within a tire casing instead of an air-inflated inner tube. It is the object of my invention to provide a filler of this character formed of rubber or like resilient material and having therein a multiplicity of uniform pockets containing air not normally under compression, but in which the air is compressed by distortion of the casing, to thereby produce substantially the resilience and cushioning effect of the usual air-inflated tire. A further object of my invention is to provide a structure of this kind using a minimum quantity and weight of rubber in the construction thereof. A further object of my invention is to provide a filler of this character which may be formed initially in a plurality of relatively thin strips, whereby the specially formed air-pockets may be molded therein and the strips subsequently assembled to seal the pockets and confine the air therein. A further object of my invention is to provide means for interlocking the separately formed cushion-strips to insure the assembling thereof in exact relation and to prevent relative movement thereof after their assembly. A further object of my invention is to provide means for holding the bead-portions of the casing in firm engagement with the metal rim on which the tire is carried, to prevent circumferential slippage of the casing and the entry of foreign matter thereto between the beads and rim.

In the accompanying drawings Figure 1 is a transverse section of a tire provided with a filler embodying my invention, Fig. 2 is a detail vertical section on the line 2 of Fig. 1, Fig. 3 is a perspective view of a portion of the air-pocketed cushion-strip characterizing my invention, Fig. 4 is a transverse section showing a slightly modified form of the filler, and Fig. 5 is a detail vertical section on the line 5 of Fig. 4.

The basic structural member of the filler provided by my invention is a cushion-strip molded integrally of resilient material 6 such as soft rubber, and having in opposite faces thereof longitudinal and lateral rows of pyramidal air-pockets 7. The larger ends of the pockets open to the faces of the strip, and the smaller ends or apices thereof extend nearly to the opposite faces but do not open thereto. The pockets of each row are spaced apart so that the intervening portions of the faces of the strip are slightly wider than the mouths or openings of the pockets. The pockets of adjoining rows are alternating or staggered both laterally and longitudinally, and the pockets of the opposite faces are interspaced, so that the apex of each pocket lies between and adjacent and symmetrical to the openings of four adjacent pockets of the opposite face. In consequence of this arrangement of the pockets, the walls of resilient material 6 between the pockets are substantially uniform throughout, and when the pockets are sealed and the cushion is under pressure said walls thicken and flow into the pockets to thereby gradually compress the air therein according to the amount of external pressure exerted upon the material.

Intermediate the openings of the pockets, on those faces of the cushion-strips which are juxtaposed in forming the filler, there are provided trunco-pyramidal lugs 8 integral with the body material 6, said lugs being adapted to enter the ends of the pockets of the adjacent strip, fitting therein so as to substantially seal the same, the lugs and pockets of the two strips mutually interengaging and positively preventing relative lateral movement of the strips.

In that embodiment of my invention illustrated in Figs. 1 and 2, the inner and outer portions of the filler are formed by a pair of cushion-strips A of D-shaped transverse section, each having an arcuate face and a chordal or substantially flat face to which the air-pockets 7 open. The intermediate portions of the filler are likewise formed by a pair of cushion-strips, said strips B having parallel substantially flat faces to which the air-pockets open, and arcuate edges or side-portions. One of the cushion-strips of each pair is reversed relatively to the other so that the outer side of one corresponds with the inner side of the other, and the four strips together form a filler of substantially circular transverse section adapted to fit within and fill a tire-casing C, except the space between the beads of the casing and adjacent to the rim R on which the tire is mounted. In said space there is disposed a metal spacing-ring having an intermediate concave part 9 adapted to fit against the adjacent curved face of the cushion-strip A, and laterally facing V-shaped side-portions 10 which fit around the pointed adjacent edges E of the casing-beads. The concave intermediate part of the spacing-ring has a row of trunco-pyramidal projections 11 extending outwardly therefrom and adapted to enter the ends of the central row of air-pockets of the adjoining cushion-strip to interlock the spacing-ring and said strip. The rim R may be formed with a central outwardly extending ridge 12 adapted to enter the space between the adjacent edges of the ring-portions 10, to keep the same spread laterally and insure the holding of the casing-beads out against the flanges of the rim. In said ridged part of the rim there may be placed at intervals rivets 12' adapted to enter the hollow parts of the projections 11 of the spacing-ring, as shown, to thereby retain the same in definite circumferential relation to the rim.

The rim used with the tire may be either trans-split and have integral flanges, as shown, or any of the well-known forms of "quick-detachable" rims, having removable side-flanges, may be employed.

The modified form of the filler, shown in Figs. 4 and 5, is intended for use in the larger sizes of tires, wherein the weight of the filler is an important consideration, and wherein the resilience of a complete filler for the casing may not be required. In said modified form, the outer portion of the filler is made of two cushion-strips A and B identical with the outer pair of strips in the first described filler. Inside the strip B, there is a specially formed strip D, provided at its outer face with air-pockets 7 and lugs 8 respectively opposite the lugs and pockets of the adjacent face of the strip B. The sides or lateral edges of the strip D are arcuate, to form continuations of the corresponding edges of the strip B. The inner face of the strip D is arched concavely to fit upon the convex arched intermediate portion 13 of a metal spacing-ring which is disposed in the casing between the bead-portions thereof and adjacent to the rim. Said convex part of the spacing-ring has a row of projections 14 at the crown thereof which fit into similarly formed cavities in the inner side of the strip D. Said spacing-ring also has side-portions 15 which fit around the inner edges of the base-portion of the casing to keep the same spread laterally against the flanges of the rim, and at the juncture of said side-portions 15 and the arched intermediate portion 13 there are folds of the metal forming flanges 16 which fit around portions of the strip D to prevent disproportionate spreading of the inner part of said strip under pressure thereon over the arch of the spacing-ring. Displacement of the side-portions 15 toward each other is prevented by a metal band 17 disposed around the rim R centrally thereof, said band being retained in place by tongues 18 turned in over the face thereof from said side-portions 15 of the spacing-ring, as shown.

From the foregoing description the structure and mode of operation of the filler will be apparent. It may be noted that the pocketed cushion-strips A, B and D may be molded initially either in the annular form in which they are assembled, or as rectilinear strips, although molds for the latter are much easier to construct. After formation of the cushion-strips, the filler may be formed by merely juxtaposing the strips in proper relation, so as to enable subsequent dis-assembly thereof, or the strips may be permanently connected by cementing or vulcanizing them together to form a substantially integral body. By any of the methods of assembly all of the air-pockets opening to the adjoining faces of the strips are substantially sealed to confine the air therein, and the pockets opening to the peripheral part of the filler are likewise closed when the filler is placed within the casing. Thus the filler has a multiplicity of uniform, separate, closed air-spaces therein, with uniform walls of resilient material between them adapted to flow into the pockets under pressure upon the tire and by moderate distortion of the form of the filler, so that the air confined in the pockets is compressed and the resistance of the filler to distortion thereby progressively increased proportionally to the increase of the load thereon.

Now, having described my invention, what I claim and desire to secure by Letters Patent is:

1. A resilient filler for tire casings, comprising concentric strips of resilient material juxtaposed radially, each having rows of interspaced pyramidal air-pockets opening to opposite faces thereof and separated by walls of substantially uniform thickness, the juxtaposed faces of the strips having lugs thereon adapted to mutually enter and stop the openings of the air-pockets in said faces.

2. A resilient filler for tire casings, comprising a plurality of concentrically juxtaposed cushion-strips of resilient material, each having series of air-pockets therein opening to the faces thereof, the faces of said strips intermediate said openings being proportioned and arranged to cover the openings in the faces of opposing strips, and interengaging means on the opposed faces of the strips for retaining the same against relative lateral movement.

3. A tire-filler-forming cushion-strip of resilient material having longitudinal and lateral rows of pyramidal air-pockets formed in opposite faces thereof, the large base-ends of said pockets opening to said faces and being spaced apart and staggered in adjacent rows, the pockets of opposite faces being interspaced whereby the apex of each pocket extends between the bases of pockets of the opposite face and the walls between the pockets are of substantially uniform thickness, and the face-portions between the pocket-openings being wider than said openings.

4. The combination with a flanged wheel-rim, and a tire-casing having bead-portions fitting upon said rim between the flanges thereof, of a sheet-metal spacing-ring having side-portions fitting against the inside of the casing adjoining the rim and adapted to maintain a spread of said beads against the rim-flanges, said ring having an intermediate portion spaced from the rim and connecting said side-portions, an air-pocketed filler of resilient material seated upon the intermediate portion of said ring and occupying the space within the tread-portion of the casing, and interengaging means between the spacing-ring and filler to prevent relative circumferential movement thereof.

5. The combination with a flanged wheel-rim, and a tire-casing having bead-portions fitting upon said rim between the flanges thereof, of a sheet-metal spacing-ring having side-portions fitting against the inside of the casing adjoining the rim and adapted to maintain a spread of said beads against the rim-flanges, said ring having an intermediate portion spaced from the rim and connecting said side-portions, an air-pocketed filler of resilient material seated upon the intermediate portion of said ring and occupying the space within the tread-portion of the casing, and interengaging means between the spacing-ring and filler and between the wheel-rim and spacing-ring for preventing relative circumferential movement of the respective parts.

ARTHUR L. RUNYAN.